United States Patent [19]

Weichel

[11] 4,078,626
[45] Mar. 14, 1978

[54] AGRICULTURE MACHINE

[76] Inventor: Ernst Weichel, P.O. Box 1180, 7326 Heiningen, Germany

[21] Appl. No.: 612,741

[22] Filed: Sep. 12, 1975

[30] Foreign Application Priority Data

Sep. 13, 1974 Germany .............................. 2443915

[51] Int. Cl.² .............................................. B60K 17/28
[52] U.S. Cl. ................................ 180/53 R; 180/53 D;
180/53 FE; 180/1 F; 111/1; 180/77 S
[58] Field of Search .............. 180/53 R, 53 D, 53 FE,
180/1 F, 77 S, 89 R

[56] References Cited

U.S. PATENT DOCUMENTS

| | | | |
|---|---|---|---|
| 3,154,164 | 10/1964 | Shaw et al. | 180/1 F |
| 3,693,744 | 9/1972 | Horn et al. | 180/53 R |
| 3,720,047 | 3/1973 | Lely | 180/77 S |
| 3,921,742 | 11/1975 | May et al. | 180/1 F |

FOREIGN PATENT DOCUMENTS 488,895   1/1954   Italy ...................................... 180/1 F Primary Examiner—Joseph F. Peters, Jr.
Assistant Examiner—Donn McGiehan
Attorney, Agent, or Firm—Toren, McGeady and Stanger

[57] ABSTRACT

In an agricultural machine, four attachment compartments are provided, a first one in the front of the machine, a second in the rear of the machine, and a third and a fourth between the first and second attachment compartments. In each compartment, a working device such as a hoeing device, a manure spreader, a plough, and the like is mounted so that a series of steps may be carried out during the movement of the agricultural machine. The machine can be used for harvesting when it is equipped with harvesting working devices, for soil treatment when it is equipped with a plough, harrow device, and other soil working devices, and can be used for other tasks by the attachment of the appropriate working devices.

4 Claims, 14 Drawing Figures

AGRICULTURE MACHINE

BACKGROUND OF THE INVENTION

The object of this invention is to provide a motorized agricultural machine of the type having two driven axles and at least three different attachment compartments, to enable the optional attachment of various working appliances for working the soil for tillage, cultivation and harvesting to be attached as required.

All known motorized agricultural machines suffer from the drawback that they are not suitable for all operations involved in working the soil, fertilization, tillage, cultivation, insect control and harvesting for all the usual crops encountered in farming units, so that not only the usual tractors but also special appliance carriers, for example, for tillage and cultivation must be used, and these generally are not suitable for fertilization, still less for harvesting operations.

Special harvesting machines such as field choppers, pick-up presses, loading vehicles, beet harvesting machines, potato harvesters and transport vehicles are not suitable for working the soil, tillage, fertilization and cultivation. Manure spreaders designed for spreading farmyard manure and liquid manure are not suitable for the transportation of crops, still less for working the soil or for the care of field crops. The mechanization of agriculture, with numerous machines of various kinds and with many categories of vehicles, necessitates considerable capital which average size agricultural concerns are unable to invest. The trailers or attachment appliances hitherto known call for powerful tractors and are becoming heavier, so that the continually more powerful tractors can be adequately utilized. This increasingly mechanized field cultivation causes more and more serious damage to the soil as a result of the pressure by heavy vehicles exerted thereon. The lower yields, caused by the deterioration in the biological quality of the soils, cannot be counteracted even by the use of larger quantities of water-soluble manures and toxic weed-killers, pesticides and the like except at the price of a worsening of the quality of the products.

Known farm tractors with steered front wheels of comparatively small size and with very large rear wheels suffer from the additional drawback that working appliances can be built on them only in front of the front axle or behind the rear axle. Their comparatively narrow and frequently varying angle also results, in the case of many agricultural tasks, in numerous ground tracks made by the tractor and by the various working machines and often situated side by side.

A further disadvantage of tractors with bulky rear tyres is that they do not travel satisfactory in row crops and tend to tilt over.

Tractors of which only the rear axle is driven cause additional damage to the soil by the slipping of the wheels, besides being insufficiently steerable over loose soil.

Whilst other known types of special tractor with four driven wheels of equal size are known, a driver's compartment above the front axle and a loading platform above the rear axle are fitted with three attachment compartments for working appliances and these tractors have fairly satisfactory travelling properties. However, these likewise suffer from all the drawbacks attendant upon the comparatively narrow gauge of the usual tractors. Furthermore, their ground clearance under the driven axles is so limited that neither working appliances nor conveying devices for any crops up in front of the front axle could be mounted between the axles.

More recent known tractors with four driven wheels, either of equal or of different size, and with attachment compartments in front of the front axle, behind the front axle, and a loading surface situated behind the driver's compartment occupying a central position above the two axles, have substantially the same disadvantages as the types of construction previously described.

A known apparatus carrier with a motor, gearing and driver's compartment mounted above or behind the front axle and with a connecting frame between the front axle and rear axle, having ample ground clearance and equipped with attachment devices for working appliances and also capable of taking a loading platform, would be provided with four attachment compartments for working appliances if attachment devices of the kind known per se were to be installed in front of the front axle in addition.

This vehicle, however, suffers from the drawback that only light working appliances, situated below and between the axles, can be installed in front of the front axle, and that only small quantities of material can be transported on the loading surface, because otherwise either the steering of the vehicle would be impeded or the driver's vision would be obscured.

Other known apparatus carriers with a driven rear axle and with smaller undriven steerable front wheels, their axle being connected with the drive of the rear axle via a longitudinal member situated on the centre of the vehicle, suffer from similar drawbacks. These vehicles likewise have theoretical attachment compartments in front of, between, above and behind the axles. With many operations, however, they do not enable full use to be made of these compartments, either because the height of the attachment above the longitudinal member is inadequate, owing to the necessity of preserving visability for the driver or avoiding an excessive load on the front axle.

A further construction for an apparatus carrier with small front wheels but a comparatively wide track and with a motor between the front axle and the rear axle and with a driver's seat in the middle of the vehicle for travel along public roads and also with a seat over each of the two wheel tracks (adapted to the working width of seed drills and chopping machines) has attachment compartments only between the axles and behind the rear axle. There are no facilities for mounting a loading platform on the vehicle, for instance, or for attaching working appliances in front of the front axle. Whilst this vehicle produces fewer tracks on the field, it proves insufficiently steerable on sloping ground or on wet or loose soil. Above all, it is not suitable for the attachment of harvesting devices or manure spreaders and still less for the addition of loading compartments for the transporation of harvested crops.

SUMMARY OF THE INVENTION

This present invention seeks to eliminate the drawbacks of the constructions described above and to provide a motorized agricultural machine to which all known working, harvesting, transport and conveying appliances can be attached without detracting from its running properties, steerability, ability to negotiate uneven ground or safety on slopes, and which will only produce moderate pressure on the soil and a minimum number of tracks, thus being eminently suitable for all operations involved in working the soil and fertilisation, tillage, cultivation, harvesting and transport in connection with all the usual types of field crop.

According to the invention, a motorized agricultural machine of the type above mentioned is characterized by the following in combination viz:

a. In at least four different attachment positions or compartments of the motorized agricultural machine, devices for detachably mounting working appliances or transport containers or the like are provided, e.g. in front of the front axle, between the two axles, behind the rear axle and/or by the side of the wheels and/or above the rear axle.

b. The track gauge of the motorized agricultural machine is either equal to or greater than 2 meters.

c. The ground clearance of the motorized agricultural machine is either equal to or greater than 700 mm.

d. The motorized agricultural machine is equipped with four wheels of equal size, their diameter being at least 1000 mm.

e. The working width of essential working appliances is equal to the relevant track gauge or to a multiple thereof.

f. The motorized agricultural machine has at least one front, one central or lateral, and one rear take-off shaft.

g. The motorized agricultural machine can be equipped, as desired, with at least two different detachable leading platforms or transport containers, with or without scraper floor, with or without spreader mechanism, with or without loading appliance, with or without pumping or tilting device or the like.

For preference, both narrow and also wide or voluminous tires are interchangeable on the motorized agricultural machine without difficulty.

According to a further characteristic of an embodiment, the driver's compartment is mounted in front of the loading platform, being situated together with the latter between the wheels of the motorized agricultural machine as viewed from above.

In one suitable version of the motorized agricultural machine, the driver's compartment situated above or immediately in front of or immediately behind the front axle consists of two driver's seats, each of which is provided with a steering wheel, accelerator pedal, foot brake and clutch, each of these items being close to or above one of the two wheel tracks, and in such a way that the operating levers corresponding to the gear change, power elevator, take-off shafts and the like and situated in the middle of the vehicle are accessible from both driving seats.

The devices for detachably mounting working appliances in the attachment positions or compartments in front of, between and behind the axles may take the form of motor-operated or hydraulically operated power elevators for working appliances, these power elevators being usable when the loading platform or manure spreader, pumping vessle or loading compartment with tail loading appliance is mounted above the rear axle of the vehicle.

According to a particularly advantageous arrangement, the machine can be equipped with a single-axle trailer which is flexibly connected with the outer ends of the flared axle tube via two traction arms and which is supported on two large wheels comprising guide rollers and running in the wheel tracks of the motorized agricultural machine which also is provided with devices for mounting a complementary motor with fuel tank, coupling and power-transmission elements with universal-joint shaft connections, so that working appliances attached to the motorized agricultural machine can also be driven direct by the complementary motor.

For preference, the special trailer is also capable of being equipped with devices to accommodate additional and particularly heavy working appliances and/or loading compartments or tilting bunkers with or without load-transfer devices.

A working appliance on the motorized agricultural machine may consist of a cutter blade or beater-and-cutter roller which is capable of being lowered and which is attached to the vehicle in such a way as to be adjustable in the vertical direction, and usable in its highest position for the distribution of material and in the lowest position for the collection or unloading of crops.

The driver's seat and the main operating elements for the motor, the shift gear and the lifting devices for working appliances can be mounted in the vehicle in a longitudinally and transverse displaceable manner, in such a way that, as viewed from above, they can also be situated behind build-in working appliances between the axles.

The motorized agricultural machine can also be equipped with at least one harvesting device situated in front of or between the front wheels, e.g. for potatoes, beet, vegetables, corn ears, fodder plants, and with at least one conveying or cleaning unit situated under the axles and with at least one conveying apparatus situated in front of or behind the rear axle and conveying the material upwards and with at least one cleaning or sorting device of a known kind situated above the rear axle and with at least one storage bunker or a loading surface.

With motorized agricultural machines constructed as above, the loading platform preferably is provided with devices for transferring the material to other transport vehicles, such as roller tracks and tilting apparatus, so that the harvested crops can be transferred at certain intervals to the edge of the field (without intermediate storage on the ground) to larger transport vehicles which are suitable for road transport but which cannot negotiate the field itself because their pressure on the soil would cause excessive damage.

BRIEF DESCRIPTION OF THE DRAWING

Examples according to the invention will now be described with reference to the accompanying drawings, in which.

DETAILED DESCRIPTION OF THE INVENTION

Like reference numbers indicate like parts in the various Figures.

Figure 1:
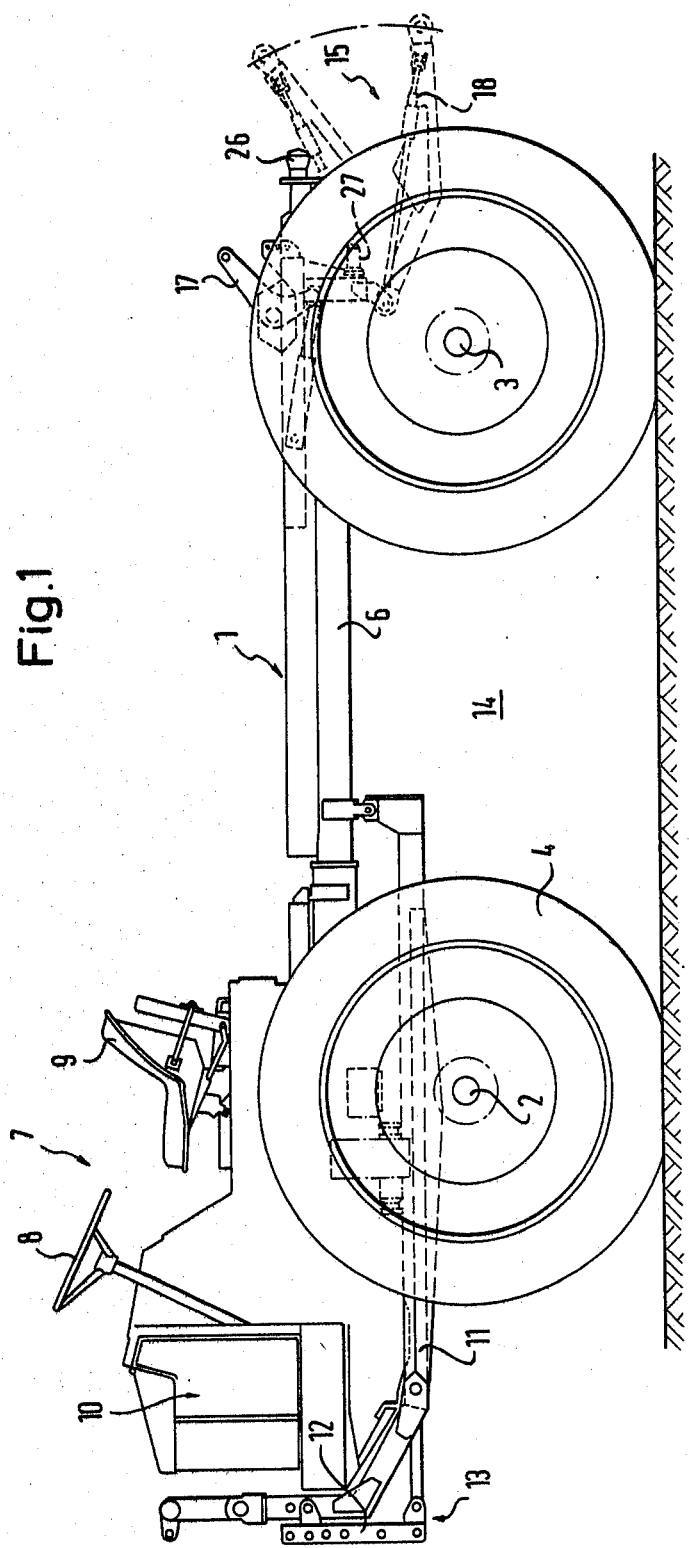
FIG. 1 is a side view.
Figure 2:
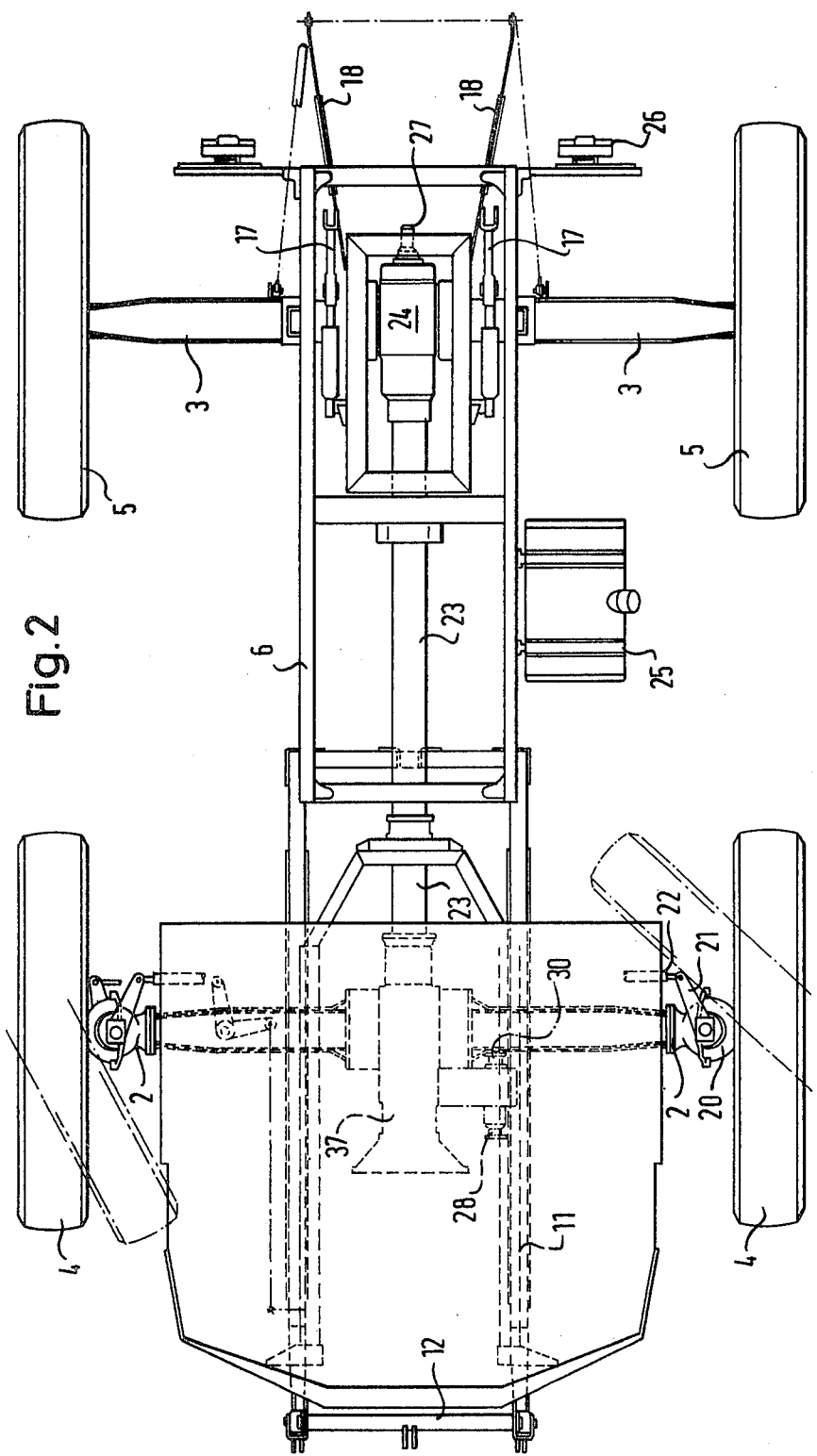
FIG. 2 is a plan view.
Figure 3:
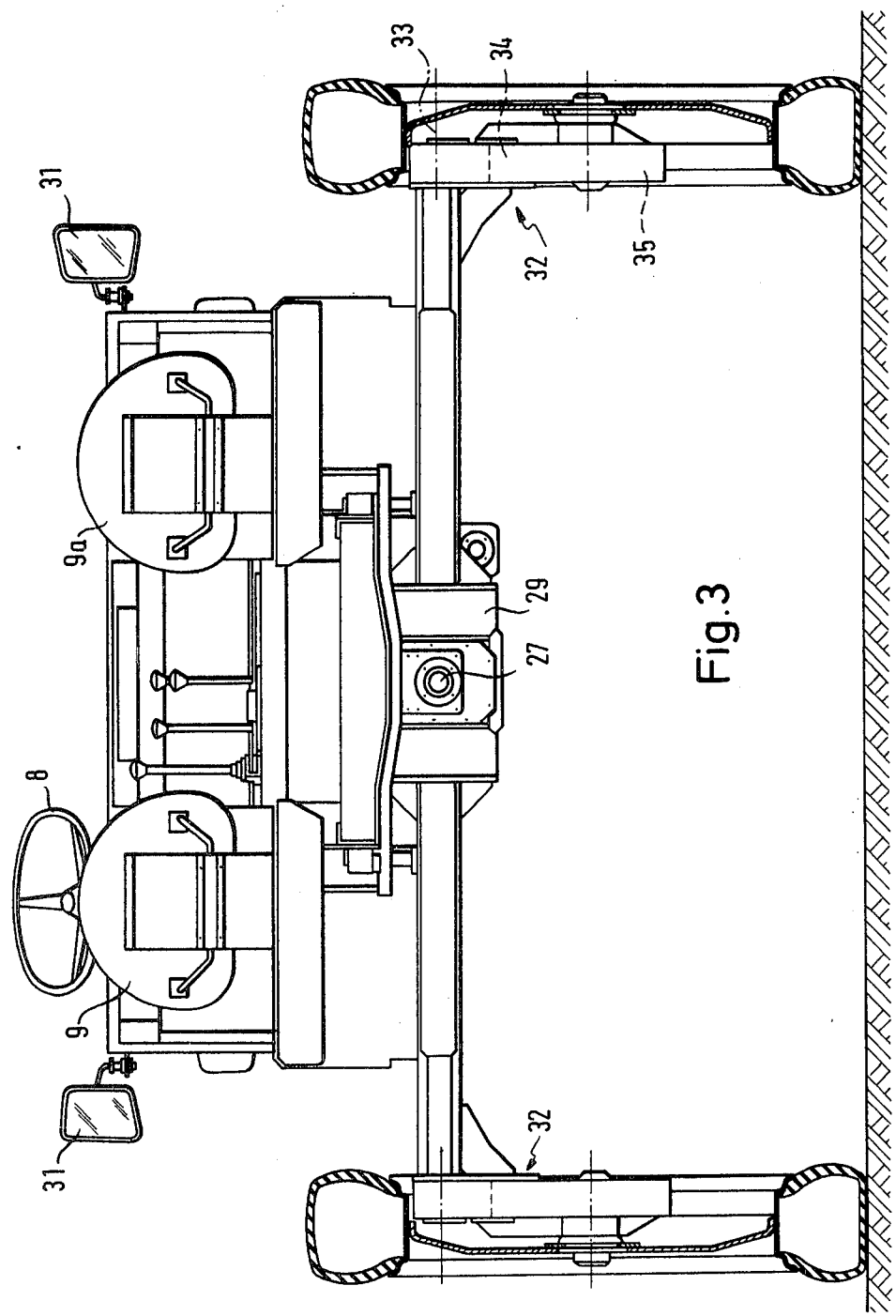
FIG. 3 is a rear view,
FIG. 4 a front view of an example of the motorized agricultural machine,
FIG. 5 a schematic plan view of a further example,
FIG. 6 a schematic lateral view, partly in section, of a further example,
FIG. 7 a schematic lateral view, partly in section, of a further example,
FIG. 8 a schematic lateral view, partly in section, of a further example,
FIG. 9 a schematic lateral view, partly in section, of a further example,
FIG. 10 a schematic lateral view, partly in section, of a further example,
FIG. 11 a schematic lateral view, partly in section, of a further example,
FIG. 12 a variant of the example shown in FIG. 11.
Figure 4:
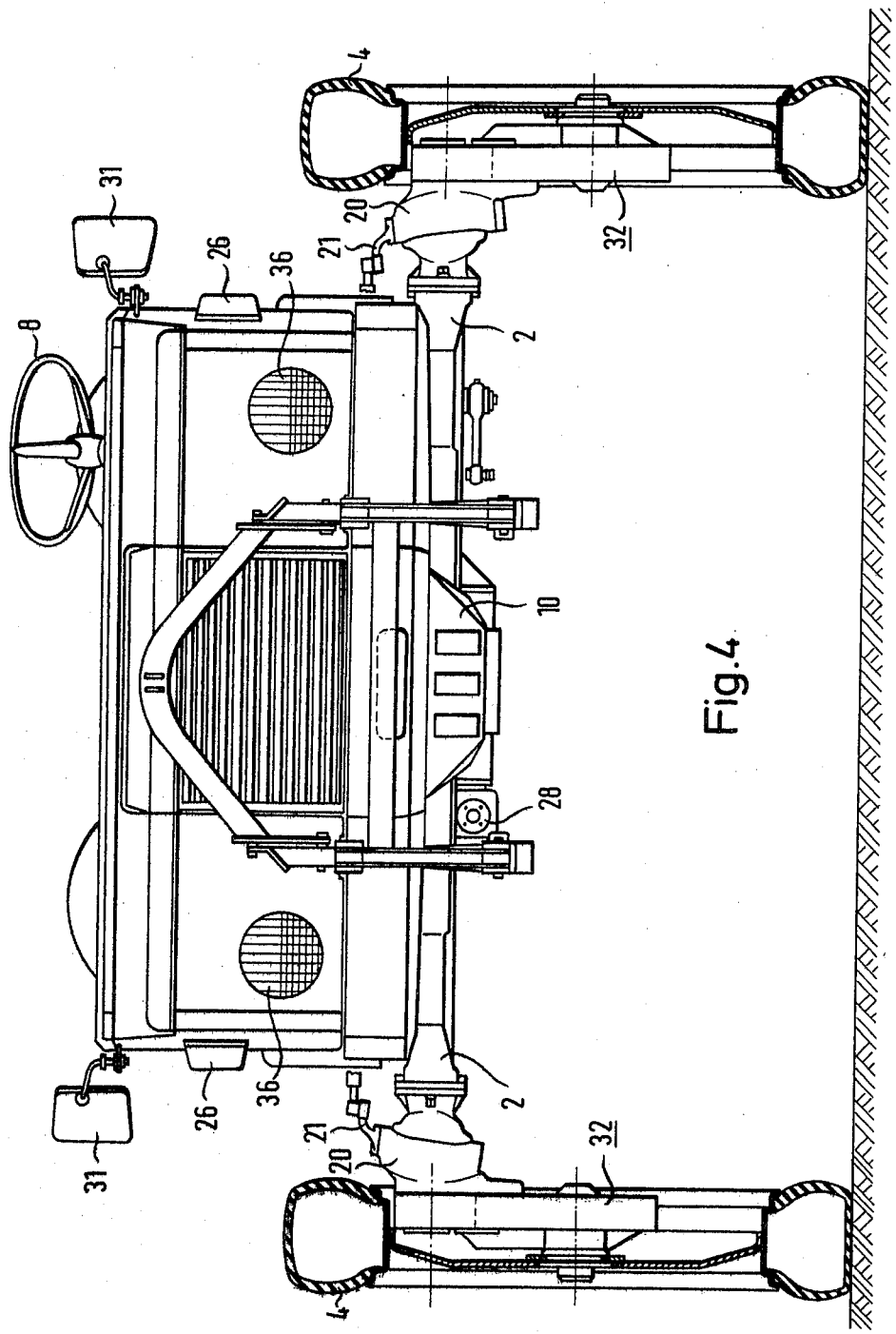

As shown in FIGS. 1 - 4, the machine has a driven front axle 2 and a rear axle 3, provided with large tires 4 and 5 respectively and connected to one another and also to the driver's compartment 7, with its steering wheel 8, its driving seats 9 and 9a and its motor gearing unit 10, as well as its differential gearing 24, via the frame 6 and also a central pipe 23. The axles 2 and 3 comprise housings accommodating axles which are not shown separately and by which the gears 37 (FIG. 5) are interconnected via back gears 32 constructed as a housing and consisting of a pinion 33, intermediate gear 34 and a gear wheel 35 (FIG. 3). An apparatus attachment frame 11 is fixed to the frame 6, which frame bears a securing block 12 for working appliances of the front attachment position or attachment 13.

Figure 5:
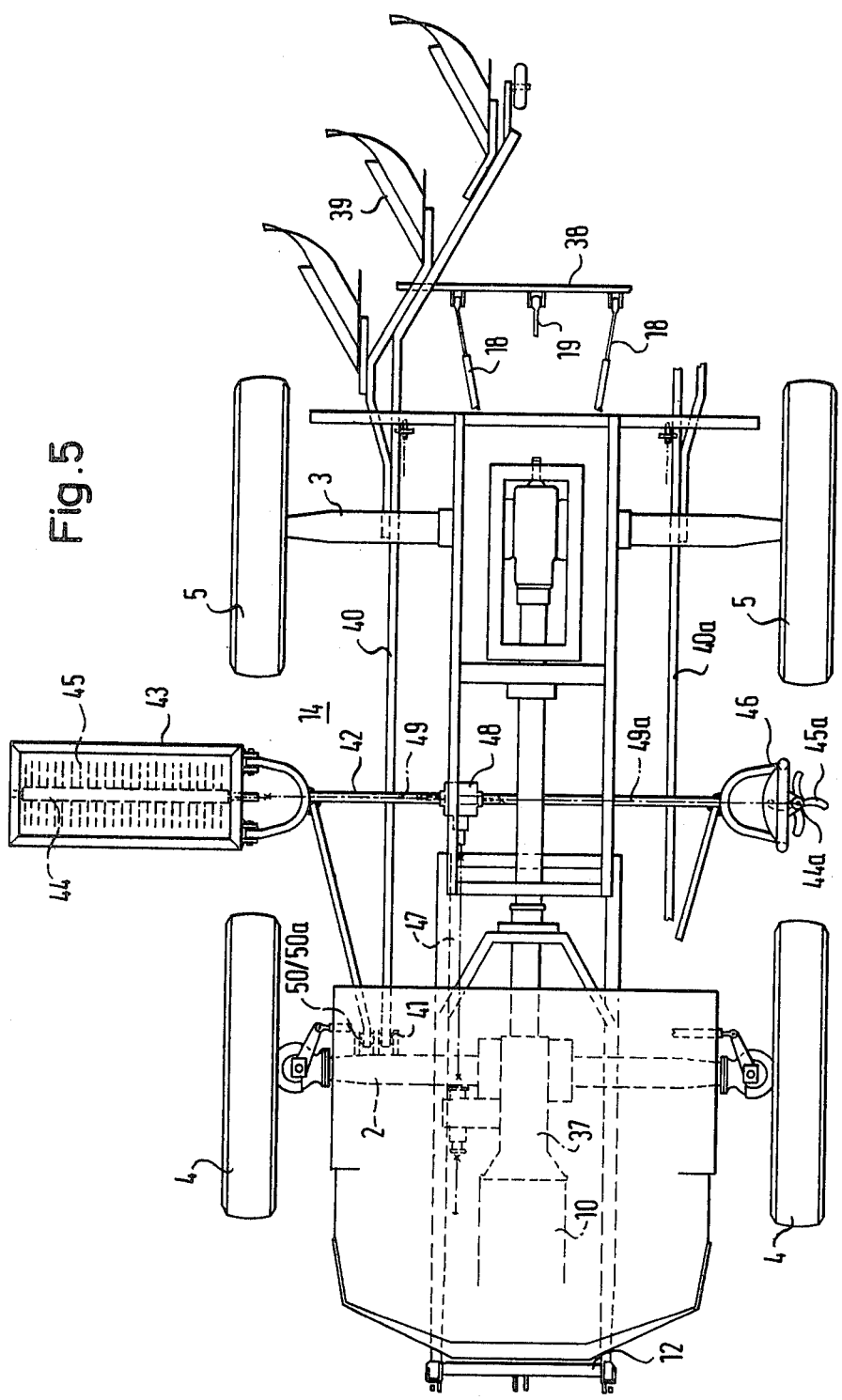

On similar lines to the front attachment position or compartment 13, a central apparatus attachement position or compartment 14 and rear apparatus attachment position or compartment 15 are equipped with lifting devices for working appliances. These lifting devices may be constructed, for example, as power elevators 17, with the lower guide rod 18 and the upper guide rod 19 (FIG. 5).

The wheels of the vehicle are steered, via the steering knuckle 20, steering arm 21 and track rods 22 (FIG. 2).

Fuel tank 25, lighting system 26, rear take-off shaft 27, front take-off shaft 28, central take-off shaft 30 (FIG. 2) and mirror 31 (FIG. 4) complete the list of components.

Brake drums 29 (FIG. 3) are not accommodated in the usual manner in the back gear 32 but in the axles 2 and 3.

As may be seen from FIG. 5, lower guide rods 18 of the power elevator may be fitted with a field rail 38 serving to lift out a plough 39, of which the beam 40 is suspended advantageously and in an easily detachable manner in a joint 41 an appreciable distance in front of the rear axle and can be lifted up by the field rail 38 or other lifting devices when the apparatus is travelling and the plough not in use.

A further plough can be mounted on the other side of the median line of the vehicle in a spaced symmetrical position to the plough 39, the only part of the further plough shown in the drawing being a portion of the beam 40a. Therefore there can be one plough in the operating position while the other can be lifted up by mounting devices (not shown) but can nevertheless be lowered easily. This arrangement, in contradistinction to tractors of the usual form, in rendered possible in the case of multi-bottom ploughs as well, due to the wide gauge, so that expensive structures represented by the known so-called rotary tillers can be dispensed with.

Between the two axles, in the attachment compartment 14, and via a bar structure 42, a frame 43 is mounted, bearing a shaft 44 which is driven via a universal joint shaft 47, gear 48 and a further universal-joint shaft 49, and which is fitted with harrow prongs 45. This harrow serves to crush and pulverise the furrows made by the plough 39 in the previous run.

The apparatus combination "plough + pulverizer harrow" may also be extended to include by a beater-chopper mounted on the front of the vehicle and not shown separately in FIG. 5. This beater-chopper can, for example, mow the stubble or basal dressing plants on the field before it is ploughed and throw them to one side, for example onto a strip of field already ploughed. The material therefore cannot be deposited low by the plough but is mixed into the surface material, i.e. deposited by the rotary harrow 46 in a manner favourable to tilth, during the crushing of the furrow.

The rotary harrow 46 may also be attached, in a spaced symmetrical position thereto, to the left of the median line of the vehicle, and turned over about a pivotal joint into the vertical position, as may be seen from the illustration of the parts 49a, 44a, and 45a when the apparatus is in the travelling position.

Figure 6:
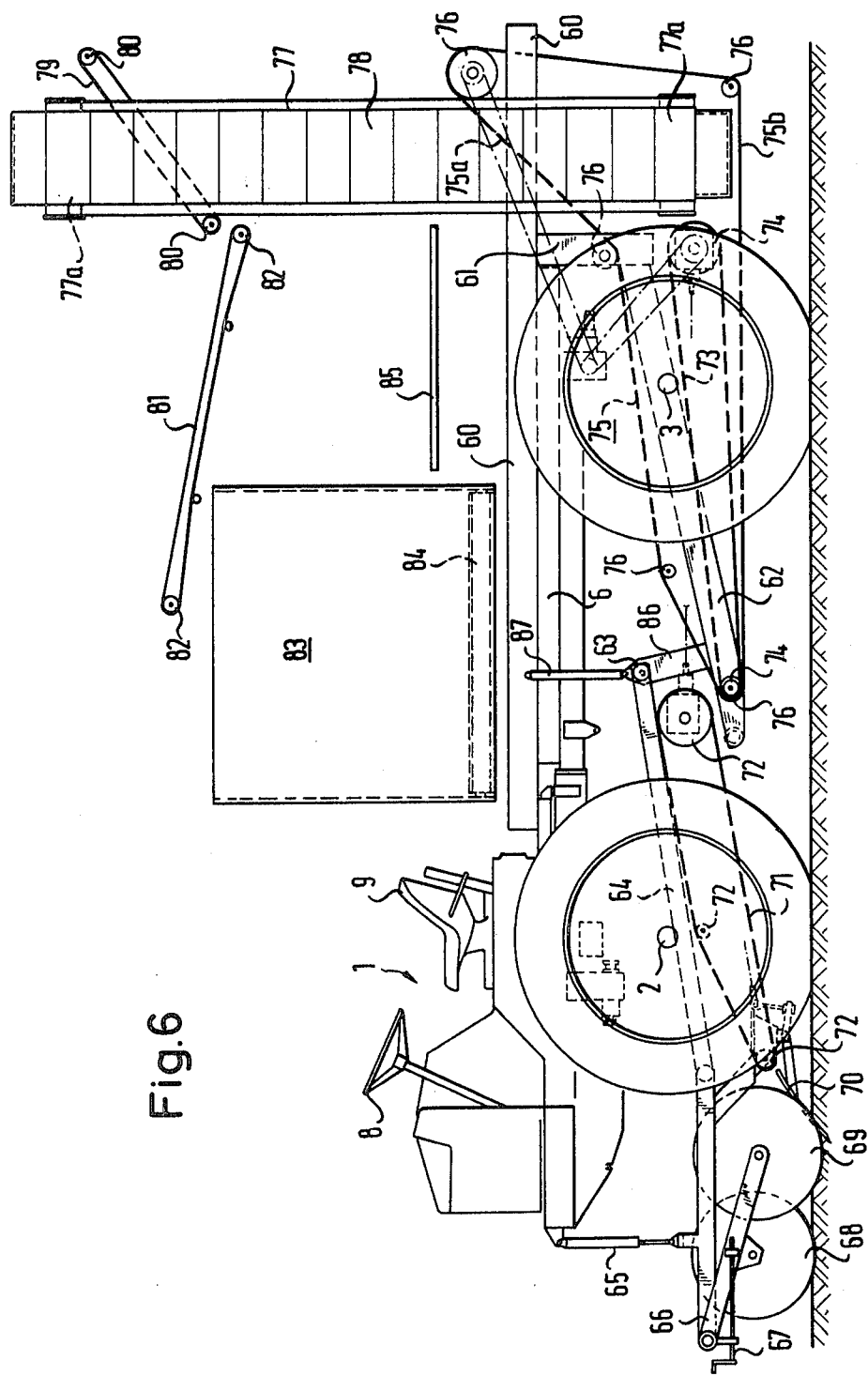

As may be seen from FIG. 6, an additional apparatus frame 60 is placed on the frame 6 of the machine and extends to the rear beyond the axle 3 when it is intended to equip the machine with harvesting, cleaning, separating, screening, conveying and collecting units, e.g. for potatoes. The frame 60 has rigid brackets 61 which are located behind the rear axle, which brackets extend down and are connected with a frame part 62 which, underneath the rear axle, extends in the direction of travel and into the attachment compartment 14.

A joint 63 is provided via a bracket 86 on the front end of the frame part 62 and is supported from the frame 60 in a suspended position by a strut 87. An oscillating frame 64 is mounted around the joint 63 in a vertically adjustable manner and can be raised and lowered to various levels by a lifting hydraulic piston and cylinder 65 suspended in the front attachment frame 13. An adjusting link 66, extending down and towards the rear and vertically adjustable by a spindle 67 within certain limits, is flexibly attached to the front end of the oscillating frame.

The frame 64 carries bearing means for a pressure roller 68 and a rolling colter 69, which are thus fixed in a vertically adjustable manner to the frame. The frame 64 also bears securing devices for a grub breaker ploughshare 70, which is immediately followed by a front screening belt 71 which passes around a number of pulleys 72 and which may be provided with complementary devices, such as weed-collecting rollers, driven beaters, or lump-crushers of customary potato harvesters.

Under the rear end of the front screening belt 71 is the front end of a further rear screening belt 73, which runs over pulleys 74. Around the front pulley 74, as viewed in the direction of travel, and also around further pulleys 76, runs a wide-meshed weed belt 75, which embraces the screening belt 73 and by which the weeds remaining on it are thrown onto the earth behind the motorized machine. Its upper strand 75a passes to the rear, between the vertical strand of a conveyor bucket chain 78 mounted in a frame 77 via pulleys 77a, while the rear or lower strand 75b returns to the foremost pulley 74 by passing under the lower horizontal strand of the conveyor bucket chain 78.

The conveyor bucket chain 78 conveys the potatoes or other field crops coming from the rear screening belt 73 upwardly and deposits them onto endless and inclined separating belt 79 which is between the uppermost sections of the two vertical strands of the conveyor bucket chain 78 and which runs over pulleys 80. From the separating belt 79 the potatoes reach a sorting belt 81 running over pulleys 82, while lumps and weed residues are thrown back onto the ground from the separating belt 79.

The frame 77 of the conveyor bucket chain is rigidly connected to that part of the frame 60 which extends backwardly and to the bracket 61.

From the sorting belt 81, on which sorters at stands 85 can sort residues of foreign bodies, the potatoes pass to bunkers 83, which are provided with roller track floors 84 and in which they are stored and can be transferred, preferably at the edge of the field, or during the actual journey, to other transport vehicles. All harvesting and conveying devices are fixed to the frame parts 60, 61 and 62 and 77 so that a self-contained constructional unit is formed. If, therefore, the clearing, conveying and cleaning devices are to be detached from the motorised agricultural machine, they can be supported on the ground, behind or over and by the side of the rear wheels, in such a manner that after the release of plug connections (not shown) and of the driving devices (universal-joint shafts) the motorized agricultural machine can move away underneath the frame 60. The appliances are built onto it by the reverse order of operations, the machine being driven back, over the oscillating frame 64 and the frame part 62.

Figure 14:
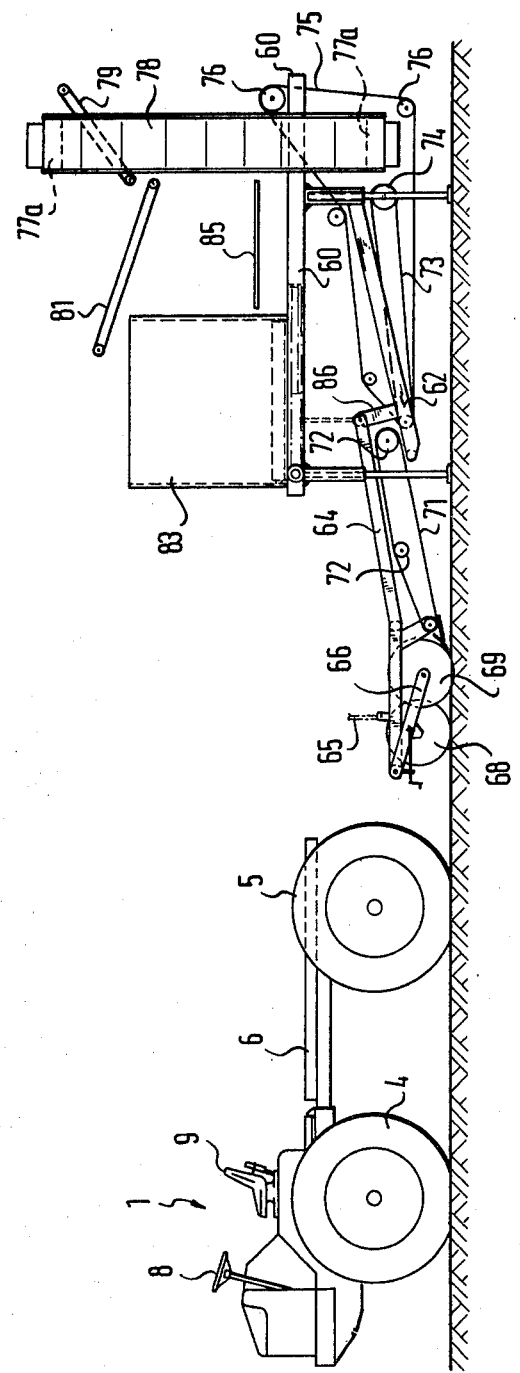
FIG. 14 is a schematic lateral view of the arrangement shown in FIG. 6, with the agricultural apparatus separated from the drive unit.

FIG. 14 is a schematic lateral diagram of clearing, conveying, cleaning and transport apparatus forming a separable constructional unit.

Figure 7:
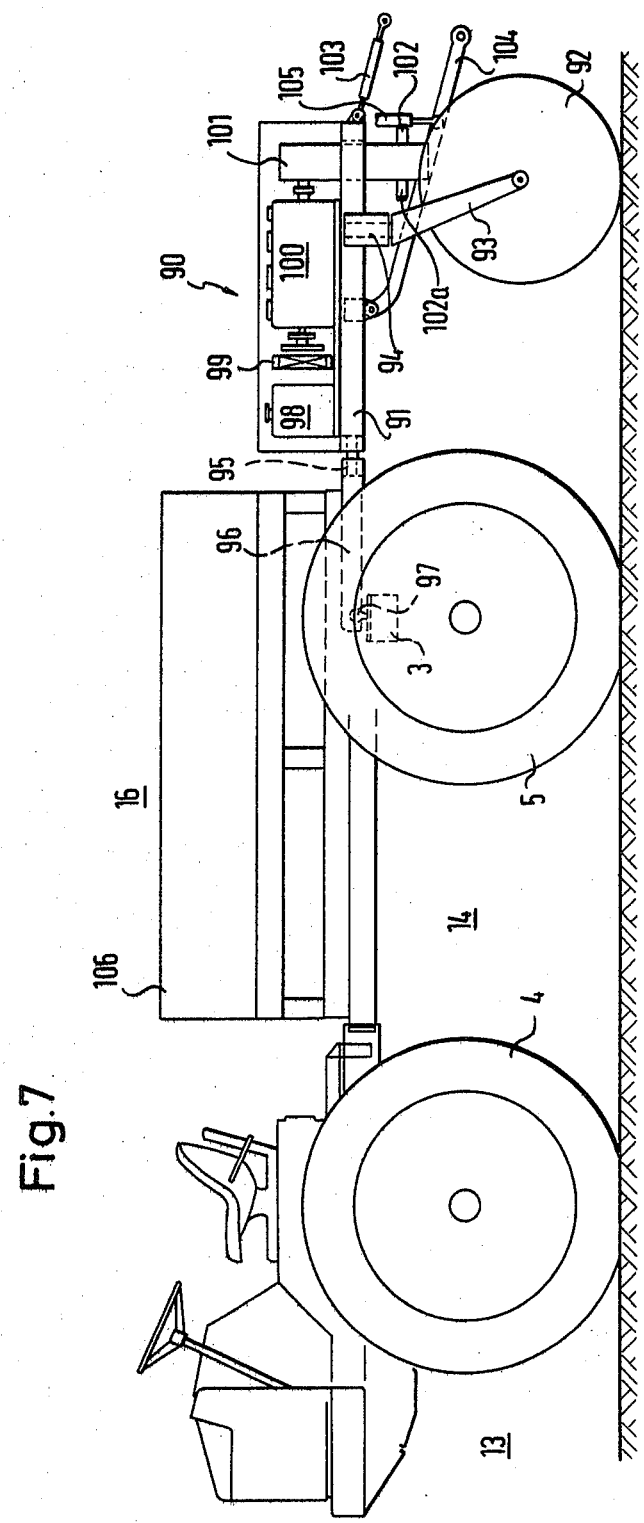

FIG. 7 shows a further example suitable for the performance of such operations or of a number of tasks necessitating such high driving forces involving the transport of such heavy loads that the motor power or the carrying capacity of the motorized agricultural machine, which in view of its use for cultivation has to be made as light in weight as possible, would be insufficient. For these special cases a single-axle trailer 90, with a frame 91, two "follow-up" wheels 92, which are steerably fixed to the frame 91 by a fork 93 and a vertical bearing 94, can be connected, by two traction arms 96 communicating with the frame 91 through a horizontal bearing 95 parallel with the longitudinal axis of the vehicle, with a hinge pin 97 or other known coupling fixed to the axle 3 of the motorized agricultural machine. The wheels 92 can thus adapt themselves to any unevenness in the ground but will themselves always remain in the track of the front and rear tires 4 and 5 of the motorized agricultural machine.

The frame 91 of the single-axle trailer carries a fuel tank 98, a radiator 99 and a motor 100 of which the crankshaft is connected with a reduction gearing 101. The secondary drive shafts of the reduction gearing are constructed as take-off shaft connections 102a, 102 extending forwardly and rearwardly, respectively.

It is also possible for a number of mutually independent take-off shafts to be provided, each of which can be actuated separately by means of a clutch (not shown). These take-off shafts are situated approximately half way along the single-axle trailer, i.e. between the wheels 92. The frame 91 also has upper guide rods 103 and lower guide rods 104 of a mechanically or hydraulically operated elevator device, to which even very heavy working appliances, such as rotary cultivators, field choppers and the like, can be connected, lifted up by lifting cylinders 105 and driven via universal-joint shafts from the secondary drive shafts 102, possibly with a variable adjustable speed device.

The forwardly directed universal joint shaft connection 102a can also drive attachment appliances arranged in the attachment compartments 13, 14, 16 of the motorized agricultural machine instead of on the single-axle trailer. This is advantageously when these appliances, although having to be carried on the motorised agricultural machine, do not have to be driven by its motor. Accordingly it is possible to accommodate a storage bunker 106 in the attachment compartment 16 and also a further bunker (not separately shown) on the frame 91, which further bunker can also be tiltable or capable of being tilted upwardly. This enables larger quantities or different kinds of crop, manure and the like to be transported at one and the same time.

Figure 8:
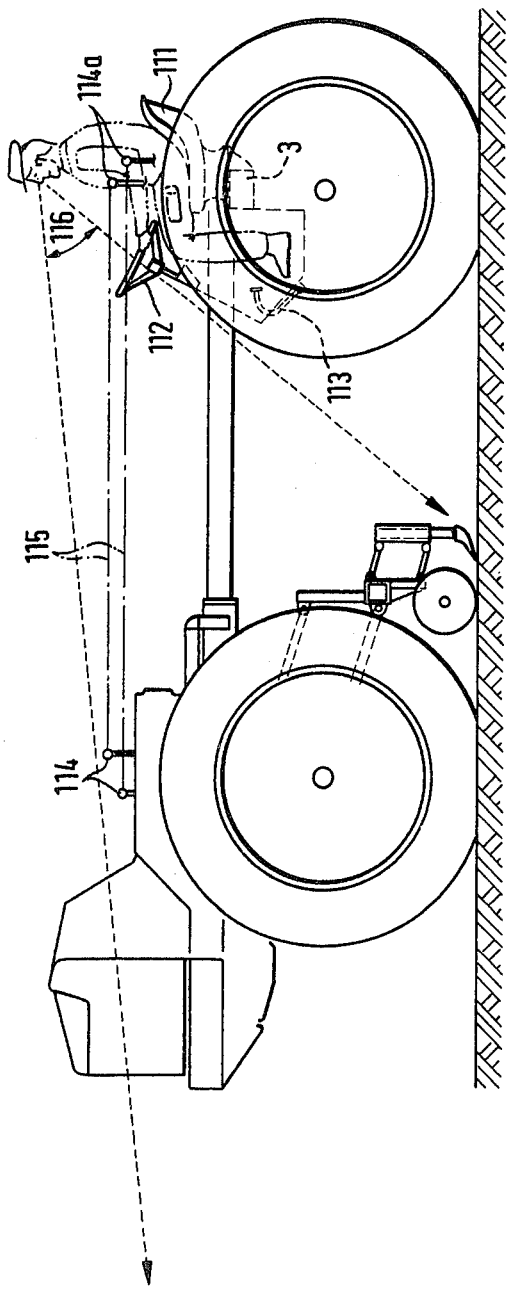

The example shown schematically in FIG. 8 is characterised in that the rear axle 3 has an additional driving seat 111 with steering wheel 112. Its steering wheel 112, or the brake lever of clutch lever 113, is connected, by hydraulic lines or flexible cables, (not shown) with the corresponding operating devices mounted in the front driving compartment. A shift lever 114 for the reduction gearing, the take-off shafts and the power elevator devices are likewise connected, via cables and bar structures 115, with corresponding shift levers 114a provided in the vicinity of the driving seat, so that the driver, in the case of certain field tasks, can control all the functions of the motorized agricultural machine from the seat 111 on the rear axle as well. This enables the working appliances for drilling and hoeing, preferably situated behind the front axle, to be observed with accuracy, because not only the appliances but also those sections of the rows of plants which are underneath and in front of the motorized agricultural machine and also the connecting tracks are present in one and the same field of vision for the driver. This enables particularly accurate work to be carried out in row cropping.

Figure 9:
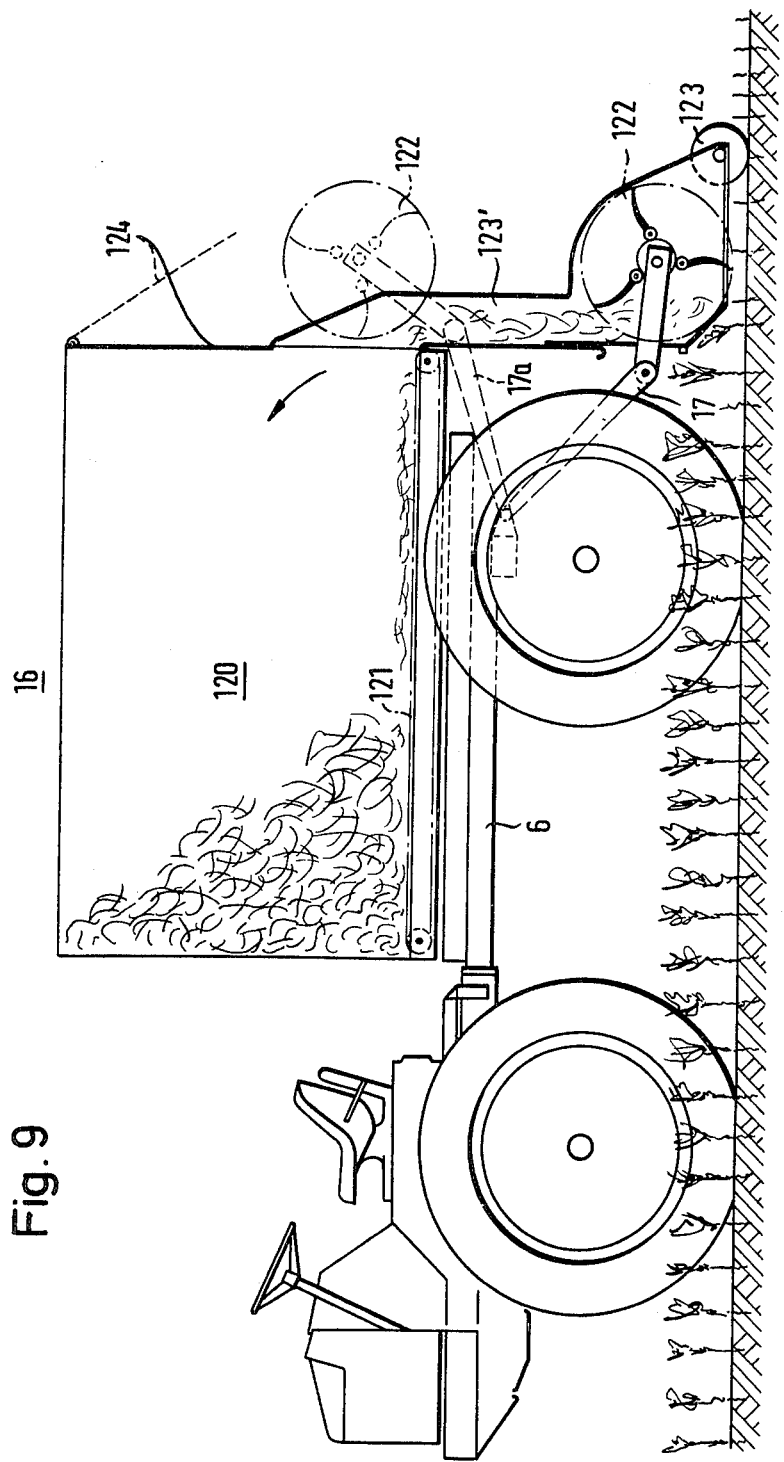

FIG. 9 is a schematic diagram of a further example in which, in the attachment compartment 16, a detachable loading compartment 120 is mounted on the frame 6 of the motorized agricultural machine. The loading compartment 120 is equipped with a roller track or scraper floor 121, operable in two directions. On the rear power elevator 17 is mounted a beater-mower 122, guided by supporting wheels 123 on the ground when in the working position and capable of beating off or taking up any plant material left in the track of the machine or any straw, plant waste or the like on the ground, crushing it and conveying it through an expulsion channel 123' into the loading compartment. This beater-mower by means of the power elevator 17, can be pivoted from the position 17 into the position 17a and also driven in the opposite direction of rotation, when occupying the uppermost position 17a. It can, therefore, even during travel, discharge towards the rear, i.e. to distribute in the track the material present in the loading compartment and conveyed forwardly by the scraper floor and partly held back by a movable rear wall of the compartment. The machine therefore makes it possible to load basal dressing material or straw on a field automatically and also, with the use of the same loading apparatus, to discharge this loaded material, which has been comminuted at the same time, on some other field, e.g. for fertilizing or covering over the field.

Figure 10:
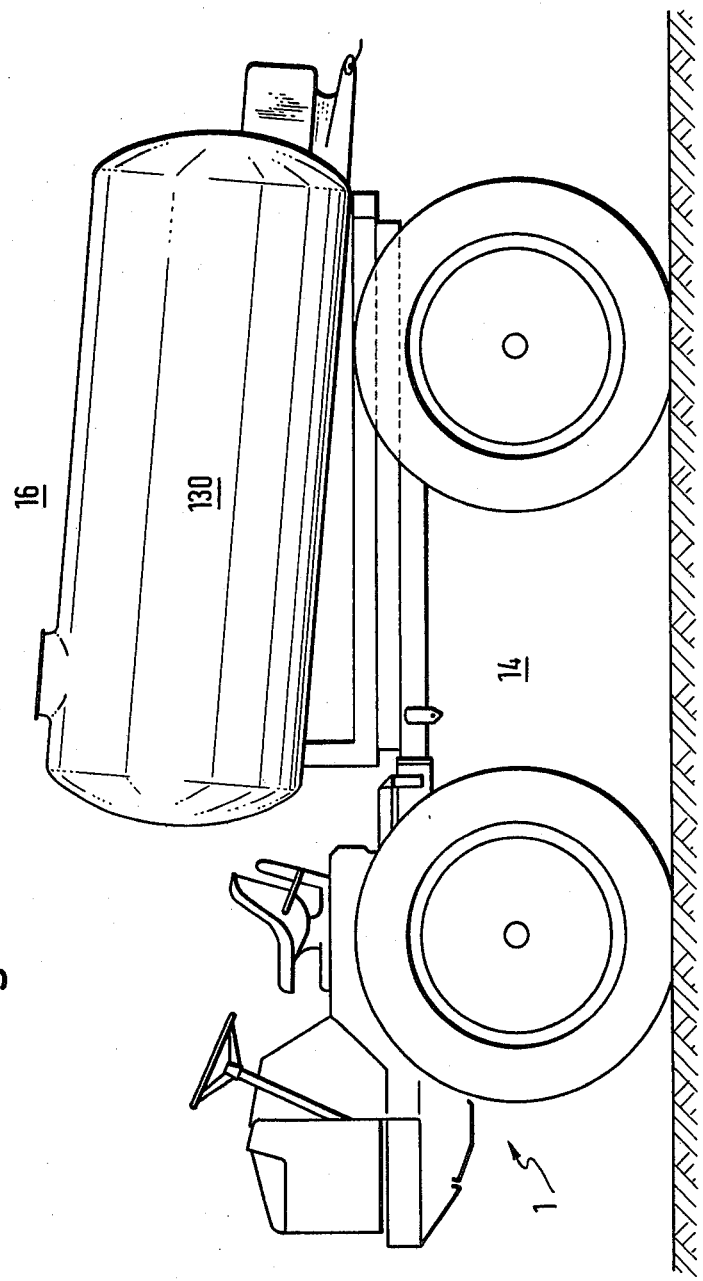

As shown in FIG. 10, the machine 1 may be equipped with a pump vessel 130 in the attachment compartment 16 instead of with the detachable loading compartment or hopper 120. The devices connected therewith and serving to fill and empty the vessel, e.g. pumps, pipes, spray bars for insecticides, are driven from take-off shafts (not shown). The pump vessel 130 can therefore be automatically filled and also used for stirring the contents of stationary containers, e.g. for liquid or semi-liquid manure and for the distribution of liquids on the field. It is, therefore, likewise suitable for the performance of those tasks in the case of row crops, because in such operations the motorized agricultural machine uses only the same tracks which were produced in the course of the drilling, hoeing and like operation. Damage occurring even in row crops when ordinary tractors with drawn trailers are used is thereby avoided.

Figure 11:
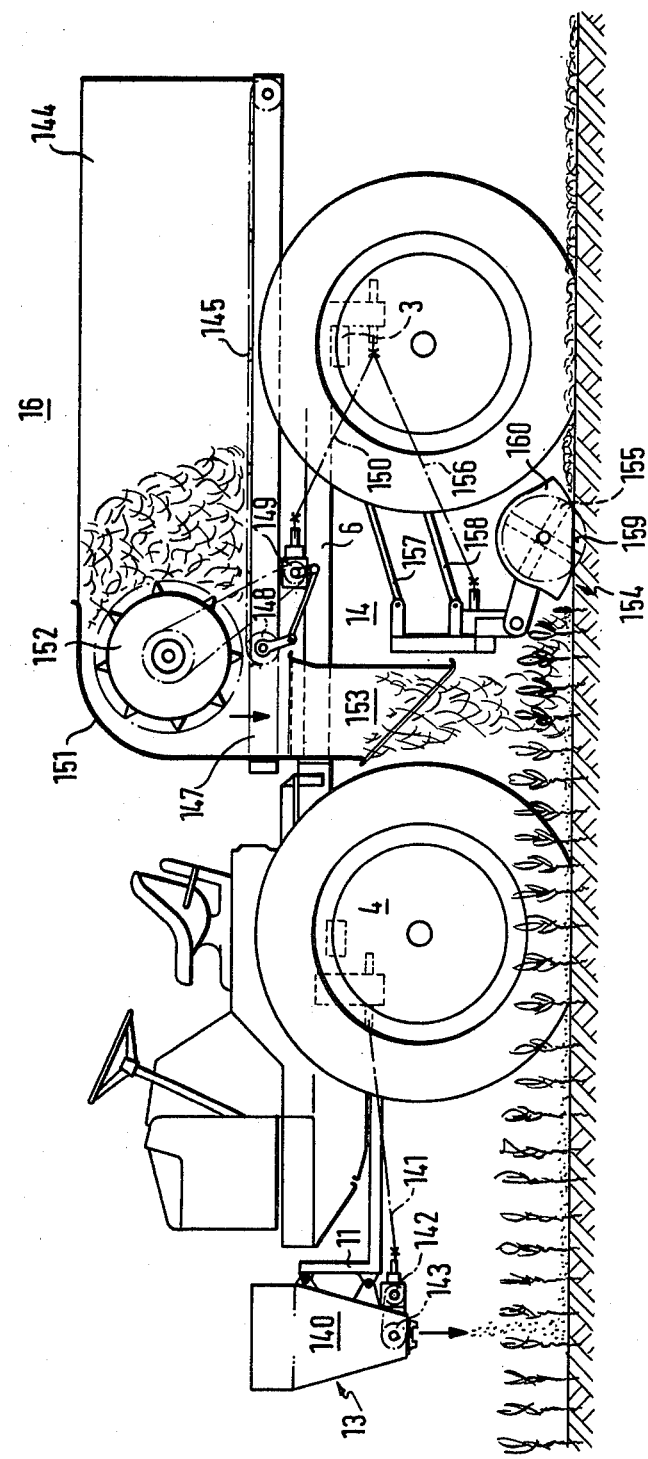
Figure 12:
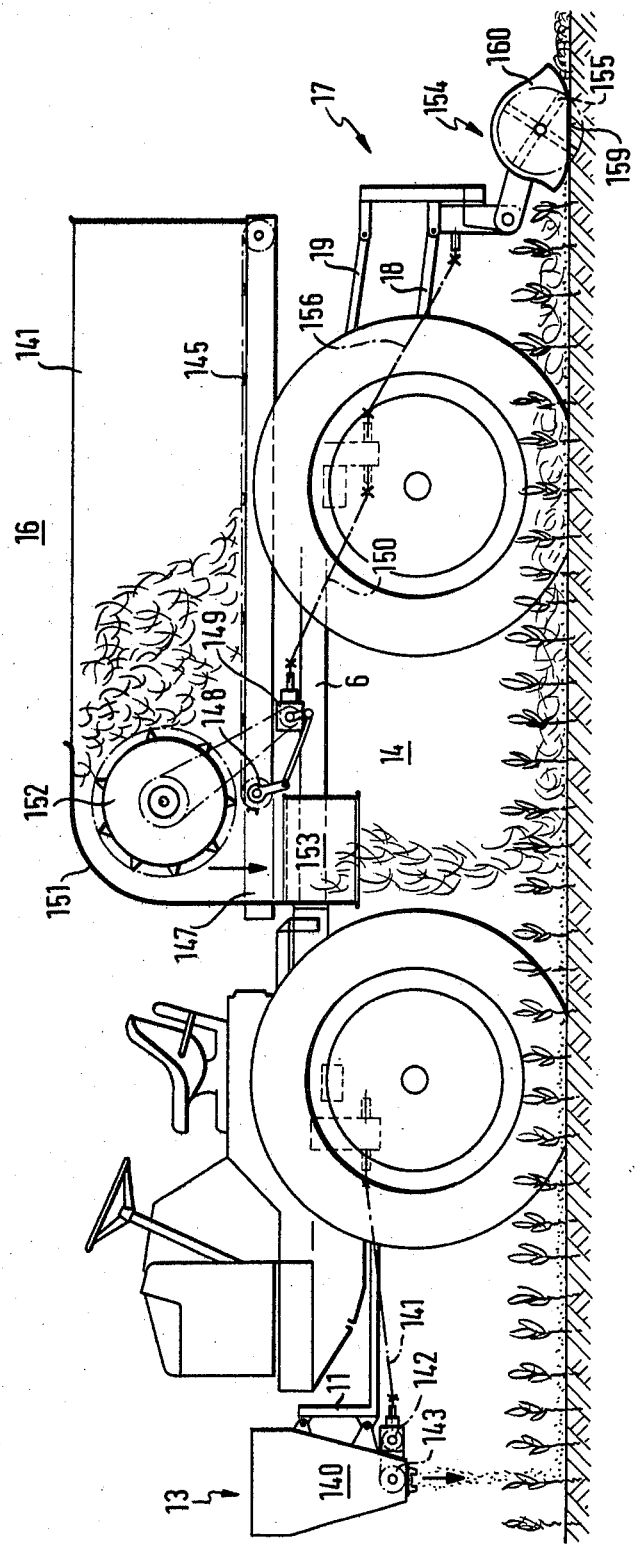

FIGS. 11 and 12 show an example in which various working appliances are installed in the attachment compartments 13, 14 and 16 in such a way that they can be used simultaneously, i.e. coupled together.

A box-type manure spreader 140, of which the working width is preferably equal to the gauge of the motorized agricultural machine, is fitted to the attachment frame 11 in such a way that the material thrown downwardly by the spreader shaft 143, driven by a universal-joint shaft 141, via the gearing 142, can be spread, in front of the front wheels of the machine, onto the ground or onto any basal dressing plants or plant residues present thereon.

A loading platform 144 is mounted on the attachment compartment 16, e.g. for farmyard manure, cut chaff, compost, and the like, with a scraper floor 145 and a horizontal spreader roller 152. Between the end wall 151 of the loading compartment and the front deflecting shaft 148 of the scraper floor is an open intermediate compartment 147. The scraper floor is driven via a step-by-step drive from a gearing 149 which in its turn is connected via a universal joint shaft 150 with a take-off shaft behind the rear axle. Through the intermediate compartment 147, therefore, the crushed material taken up by the horizontal spreader roller 152, likewise driven by the gearing 149 when the scraper floor is actuated, can, therefore, be expelled vertically downward. The narrow frame 6 can be protected, e.g. by one or more roof-shaped covers 153, in such a way that none of the particles of manure, basal dressing or chaff expelled downwardly by the spreader roller 152 can remain on the frame 6. On the contrary, they can expel downwardly in rows or else at a wide angle to the left and right of the frame 6.

There is also a hoeing appliance 154 in the central attachment compartment 14 with motor driven tools 155, as shown in FIG. 11, which appliance is also driven via a universal joint shaft 156 and which, in the travelling position, can be lifted up by the upper and lower guide rods 157, 158 of the power elevator provided in the attachment compartment 14. In the operating position, the hoeing appliance 154 is guided by the lower edge 159 belonging to the protective hood 160 and resting on the ground, the height of the appliance above the ground being adjustable.

The connection of the operations of distributing granular or pulverous commercial fertilizers in front of the front wheels with the distribution of farmyard or green manure or the like behind the front wheels or behind the rear wheels, immediately followed by chopping or hoeing, enables these various forms of fertilizer to be mixed immediately together with the upper layer of soil. This ensures immediate loss-free or more complete utilization of these fertilizers for the growth of the crops in addition to preventing losses of nutrient substances as a result of moisture or other factors.

According to the particular type of culture concerned, it is naturally likewise possible, as shown in FIG. 12, for the attachment compartment 14 to be provided merely with outlet aperture 153 for the material to be spread and present on the loading platform 144, while the chopping or hoeing appliance 154 is fixed to the upper and lower guide rods 18, 19 of the rear power elevator 17, so that the wheel tracks made by the machine can be loosened in the same operation.

Figure 13:
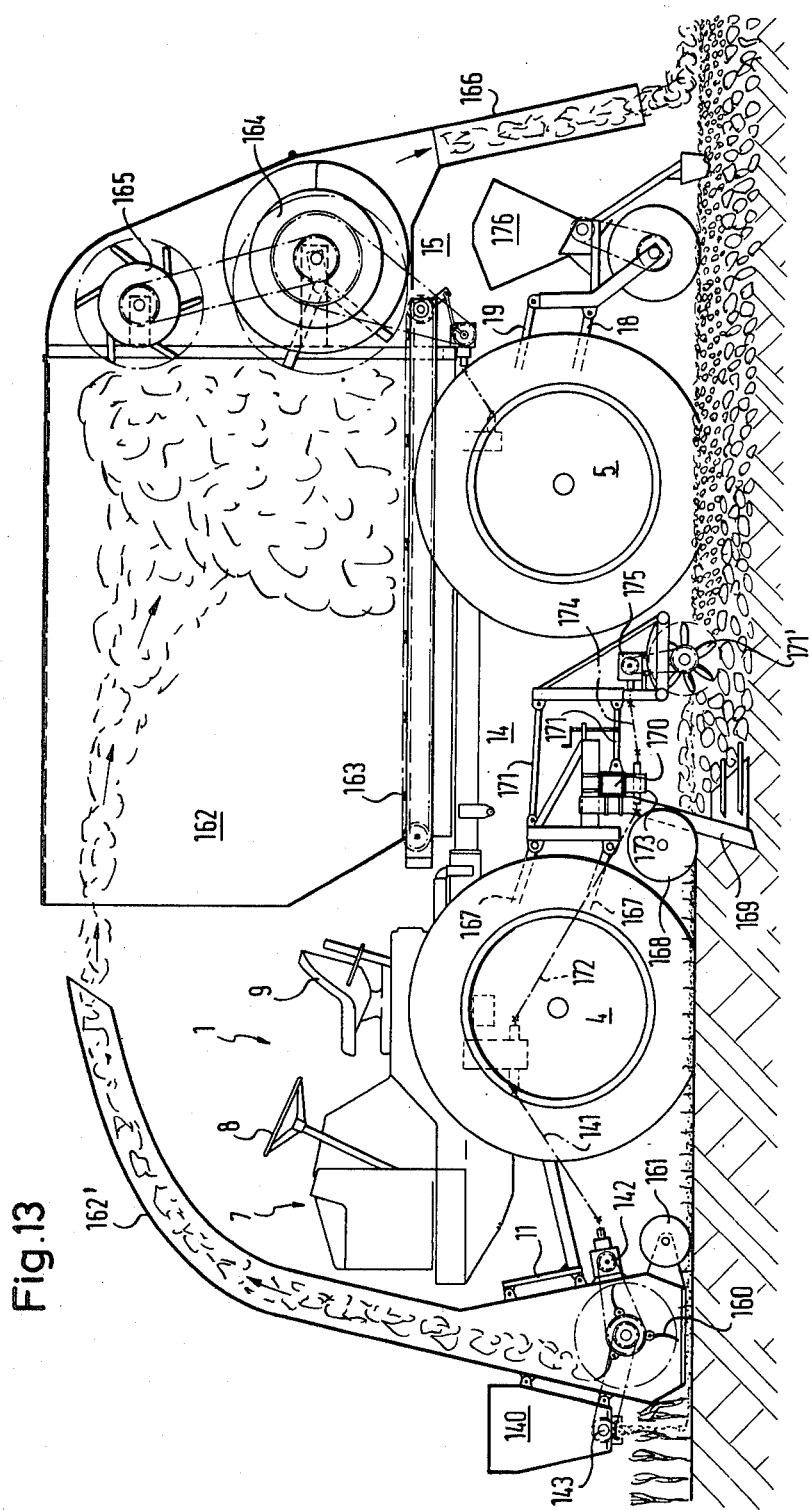
FIG. 13 a schematic lateral view, partly in section, of a further example.

FIG. 13 shows a further example, in which at least one working appliance is provided in all four attachment compartments of the machine. The functions of these working appliances can therefore be performed largely simultaneously in the operationally and agriculturally most advantageous sequence, and in such a way that the system for the first time enables the manuring, cultivation, seeding and subsequent covering of the ground to be carried out in a single run over the field.

In front of the machine, the box-type manure spreader 140 is mounted together with a front beater-mower 160, which is fixed to the front attachment frame 11 in a vertically adjustable manner, and which is driven by a universal joint shaft 141 and gearing 142 and also held spaced from the ground by supporting wheels 161.

The expulsion pipe 162' of the beater-mower extends upwardly by the side of the steering wheel 8 and the driving seat 9, in front of the driver's compartment 7, and terminates in front of the open end of a loading compartment 162 with a roller track or scraper floor 163. To the rear of the loading compartment is an apportioning or spreading device, with a lower spreader roller 164 and an upper spreader roller 165, by which the chopped material, fed to them from the scraper floor at an adjustable speed, is also fed during the further filling of the loading compartment to a spreader channel 166 behind the last working appliance in the attachment compartment 15, i.e. a seed drill 176, and by which the chopped material can be deposited on the ground as a covering. The loading compartment 162 can therefore be continually filled, during operations, with further material (basal dressing, straw etc.) and at the same time emptied by the spreader rollers 164, 165, by a certain adjustable quantity in metres per run. The material constantly stored in the loading compartment can therefore be used to balance out any varying quantities of material which may be present in different parts of the field.

A field freed of its crops by the heater-mower 160 is loosened to a selected depth, behind the front wheels 4, by a loosening device 169 mounted so as to be vertically adjustable on the power elevator 167 in the attachment compartment 14 and which may be guided by a scanning wheel 168 at an adjustable distance from the ground. Immediately afterwards the preliminarily loosened soil is crushed and crumbled, in readiness for sowing, by a motor-driven harrow or hoe 171', which is flexibly connected with the frame 170 of the loosening apparatus 169, via lower and upper guide rods 171, and which is driven by a universal joint shaft 172, an intermediate bearing 173 and a universal joint shaft 174 and a gear 175. This makes it possible for the seeding machine 176 mounted on the rear power elevator 18 to introduce the seed into the soil, which has now been freed of stubble, plant residues, straw and the like, loosened and crumbled in readiness for seeding, without risk of obstructions. Furthermore, in order to cover the soil, which is highly desirable for agricultural reasons but has so far proved impracticable in the case of field crops, plant material and straw can subsequently be placed on the surface of the prepared field which is thus protected from drying up or from a sudden local rainfall, thus assisting the tilth and the yield.

This combination of the operations of manure-spreading, beating, loosening, crumbling, seeding and covering therefore makes it possible for a field under basal dressing or just harvested to be sown immediately on the same day as the harvest in one single operation, so that the so-called shade tilth, which is favourable to crops and which is usually destroyed when fields are harvested and then re-sown at two separate times, to be utilized to the full and subsequently preserved.

This method of operation therefore results not only in a saving of labour, personnel, tractor machines and apparatus but also to considerably higher yields, because all fertilizer substances employed can be utilized more completely, the moisture of the soil protected and the number of tracks on the field reduced.

In similar fashion, other known working appliances for ploughing, harrowing, seedings, hoeing, cultivation and harvesting can be distributed among the four different attachment compartments and used in combination.

If the driving power of the motor of the agricultural machine is insufficient for the operation of the various working appliances, an additional motor can be attached in a suitable position without difficulty. Again, as already explained in the foregoing, a separate trailer with a complementary motor can accompany the vehicle for driving attachment appliances of the kind which are carried but not driven by the machine itself.

The machine is, therefore, usable throughout the year as a working machine for all operations of tillage, cultivation, care of the soil or fertilization, and can also be employed as the chassis of a self-propelling complete harvester.

The construction described above for a clearing machine can be of the single, double or multi-row type, for example, and be adapted to a wide variety of field crops by the use of different known harvesting, conveying and cleaning units in the four attachment compartments. Such harvesters are all simple to construct and can nevertheless be made to look very neat and therefore prove highly economical, because it is only the harvesting, clearing, cleaning and collecting devices themselves that have to be purchased in addition. The complete chassis, numerous drives, clutches and gear change devices, power elevators and the like are provided in the basic machine.

It can thus be seen that the machine can be used in all farming organizations for working the soil, fertilization, sowing, planting, cultivation, harvesting and transport. It enables so many tasks to be carried out with the minimum of damage to the soil that their cost can not only be distributed over a considerable area or number of hours of work but also balanced out by increased yields.

As the four attachment positions or compartments are equipped with a number of take-off shafts, e.g. three at the rear, one in the middle and one in front, and also with at least three power elevators (in the front, in the middle and at the rear), it enables almost all three-point working appliances to be attached for working the soil, fertilization, sowing, planting, cultivation, harvesting and transport. It enables so many tasks to be carried out with the minimum of damage to the soil that their cost can not only be distributed over a considerable area or number of hours of work but also balanced out by increased yields.

As the four attachment compartments are equipped with a number of take-off shafts, e.g. three at the rear, one in the middle and one in front, and also with at least three power elevators (in the front, in the middle and at the rear), it enables almost all three-point working appliances to be attached for working the soil, fertilization, sowing, cultivation and harvesting to be attached additionally to enable various transport containers, loading platforms etc., e.g. a scraper-floor manure spreader, a pump vessel, or a loading compartment with a tail load unit, to be attached as an optional measure.

It also makes it possible for harvesting, cleaning and conveying units and storage bunkers for vegetables, potatoes, beet and the like, to be built into the apparatus in a simple manner. It therefore represents a particularly economical, neat, efficient and inexpensive self-propelling complete harvesting machine for a wide variety of field crops.

According to its purpose, the motorized agricultural machine can be fitted with large wheels of different widths. This facility and the choice of the correct tire pressure enables the apparatus to be adapted in the optimum manner to the most widely varying soil conditions, i.e. by reducing the pressure or slip on the ground. Operations for the care of the coil can therefore be carried out even under the most difficult conditions which would render comparable motorized agricultural machines of other types useless.

Due to the track-to-track method of travel and the combination of several different operations, a fraction of the hitherto usual harmful wheel tracks on the field is caused. The large driven wheels also reduce the ground pressure or slip per wheel track to the absolute minimum. This fact improves the natural fertility of the soil and thus increases the yield.

With easily detachable wheel linings the machine can even drive over fully grown crops (row cropping) e.g. for late or top dressing, in order to distribute plant protection agents and cultivation substances, or for hoeing, spraying, fertilization and like operations and for harvesting mixed cultures, without causing damage to the crops.

The four large driven wheels also enable work to be carried out on pressure-sensitive or very loose and deep soil. The wide gauge is a effective safeguard against tilting, even on steep ground.

The provision of two separate driving seats with their own steering wheel, brake, accelerator pedal and clutch, in the vicinity of the left-hand and right-hand track respectively, enables the adjacent track to be clearly viewed even when travelling to and fro from a side of the field and thus ensures accurate drilling and hoeing for all row crops.

The simultaneous attachment or addition of between two and four working appliances or the installation of any desired harvesting units for potatoes, beet or vegetables, and the addition of a loading compartment with a loading unit for stalk and leaf crops, in conjunction with an efficient attachable front mowing unit or a beater-chopper, enable numerous field crops to be harvested, loaded and transported to the edge of the field or to the farm building in a single operation.

The use of scraper-floor platforms or attachable special containers enables large quantities of seed and plant material, fertilizers or harvested crops to be carried on the machine, so that the setting periods for the refilling or re-loading are reduced and ground-pressure damage, hitherto regarded as unavoidable as a result of the travel of heavy transport vehicles or combine harvesters over the ground, is prevented.

The particularly favourable conditions provided for the attachment of simple ploughs of the conventional or reversible type and the gauge of 2000–2500 mm, for example, which corresponds to all the usual row widths for any field crops, enable working machines of the same working width or a multiple thereof to be used economically.

With the rational use of multi-row side-by-side seeding or planting apparatus, it is only the outermost rows that will be found in the vicinity of a wheel track. This ensures the optimum state of the ground from the point of view of the culture and enables fully mechanised mixed culture of various kinds of vegetable to be adopted, with correspondingly higher yields. The comparatively late planting-out of e.g. potatoes, fodder, beet, vegetables, after late harvested intermediate or early crops, increases the annual yield per beet are and also facilitates the task of combating weeds.

The reduced ground pressure of the motorized agricultural machine (which is comparatively light in weight in relation to the large area over which the wheels are supported on the ground) and the ample obliquity allowed in the wheels by the wide gauge effectively reduces the depth to which they will sink in and thus the rolling friction to which the four large driven wheels are subject.

The machine can therefore be made light in weight and equipped with light working appliances, enabling additional weights for the driving axles to be dispensed with, particularly when the appliances are installed in the attachment compartments 14, 15, 16.

The all-wheel drive, the large wheels which are firmly supported even in soft, deep or wet soil and the advantageous weight distribution, in addition to the possibility of placing an additional load on both driven axles by appliances in the front and at the rear or by using the loading platform, thus render the machine eminently suitable for travel over difficult terrain, even under exacting conditions.

The ample ground clearance of at least 700 mm, moreover a is hardly likely to render the vehicle more likely to tip over on steep ground, as the higher position of the centre of gravity is both counteracted by the wider gauge and reduced by the installation of working appliances in a comparatively low position.

What I claim is:

1. An agricultural machine comprising a horizontally arranged main frame, power means, a front axle, a rear axle, said front and rear axles located below said main frame, at least one working device, at least four attachment positions on said main frame for the reception therein of said at least one working device, means for detachable mounting said at least one working device in at least one of said at least four attachments positions, said at least four attachment positions comprising a first position located in front of said front axle, a second attachment position located behind said rear axle, a third attachment position located between said rear axle and said front axle and below said main frame, and a fourth attachment position located behind said front axle and above said main frame, two front wheels spaced laterally apart on said front axle and two rear wheels spaced laterally apart on said rear axle, each of said front and rear wheels being of equal size and diameter and tires mounted on said front and rear wheels and having a diamter of at least 1000 mm and a track gauge of at least two meters, at least one front take-off shaft connected to and driven by said power means, at least one rear take-off shaft connected to and driven by said power means, and at least one lateral take-off shaft located between said front take-off shaft and said rear take-off shaft, said main frame having a ground clearance of at least 700 mm, said at least one working device having a width at least equal to the lateral spacing of each of said front and rear wheels, a detachable container member mounted on said main frame behind said front wheels in said fourth attachment position, an additional working device comprising a loading member mounted in said fourth attachment position and arranged for at least one of loading and unloading said container member, a driver's seat mounted on said main frame in front of said detachable container and positioned above, between and inwardly of said wheels, and means including power elevators for operating said at least one working device.

2. The agricultural machine according to claim 1, wherein the track gauge of said front wheels and of said rear wheels is between 2 meters and 3 meters.

3. The agricultural machine according to claim 1, comprising an additional driver's seat positioned adjacent the rear of said main frame above said rear axle, said additional driver's seat being connected to said driver's seat in the front of said main frame so at least one of said driver's seat and said additional driver's seat can be used by a driver of the machine for controlling the speed, direction, and functions of the machine.

4. The agricultural machine according to claim 1, wherein said machine comprises four working devices, a beater mower mounted in said first attachment position, a soil loosening means mounted in said third attachment position, said loading member and container member mounted in said fourth position, and a seeding machine mounted in said second attachment position.

* * * * *